(No Model.)
L. T. YODER.
MANUFACTURE OF CANDY.
No. 289,488. Patented Dec. 4, 1883.
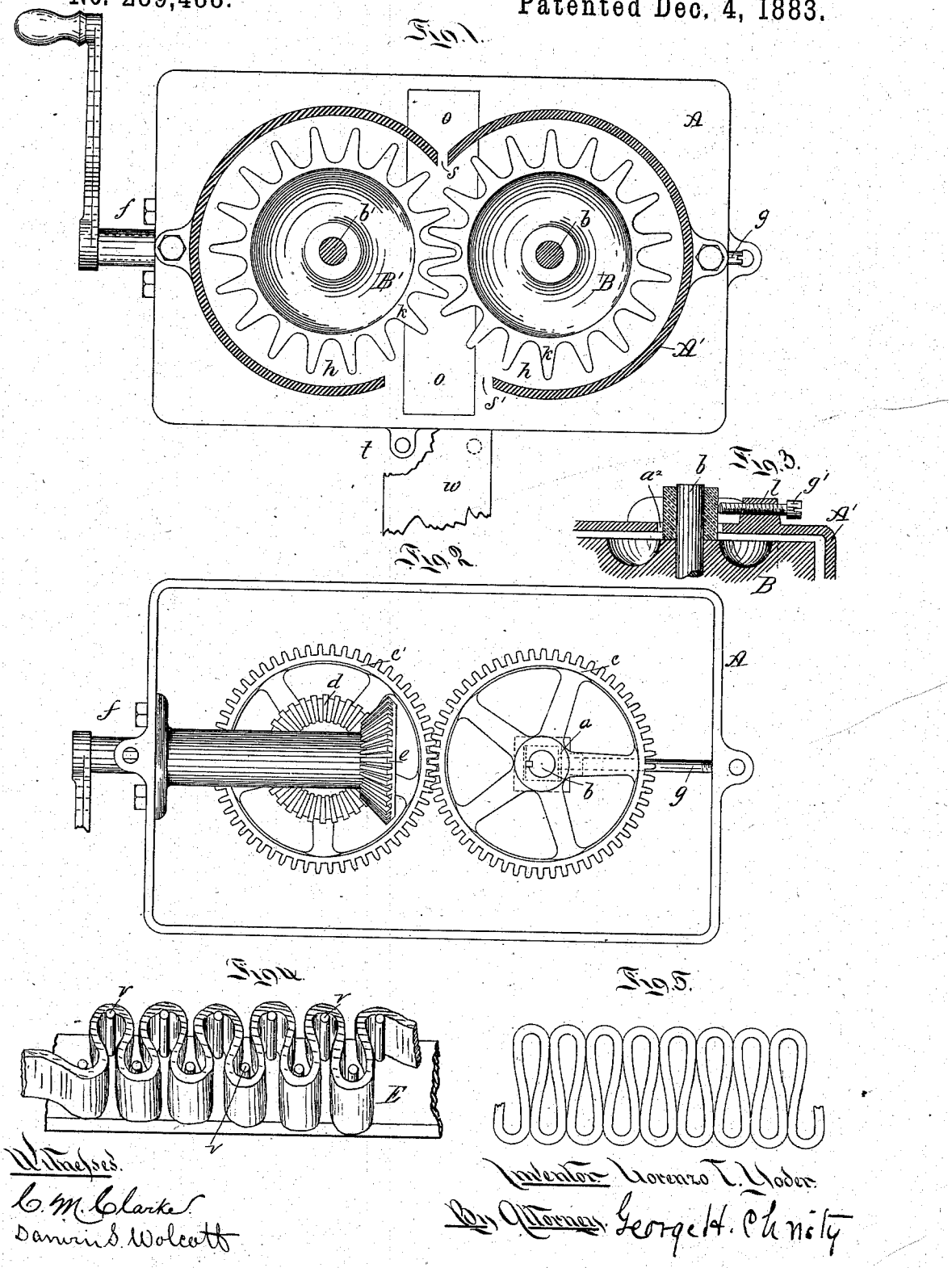

UNITED STATES PATENT OFFICE.

LORENZO T. YODER, OF PITTSBURG, PENNSYLVANIA.

MANUFACTURE OF CANDY.

SPECIFICATION forming part of Letters Patent No. 289,488, dated December 4, 1883.

Application filed October 24, 1883. (No model.)

*To all whom it may concern:*

Be it known that I, LORENZO T. YODER, a citizen of the United States, residing at Pittsburg, county of Allegheny, State of Pennsylvania, have invented or discovered a new and useful Improvement in Manufacture of Candy; and I do hereby declare the following to be a full, clear, concise, and exact description thereof, reference being had to the accompanying drawings, making a part of this specification, in which—like letters indicating like parts—

Figure 1 is a plan or top view of my machine, the cover being shown in section. Fig. 2 is an under side view, showing the arrangement of driving-gear. Fig. 3 is a detail view, showing the cover and one of the winged wheels in section. Fig. 4 is a perspective view illustrating one manner of executing my process. Fig. 5 shows my improved form of candy.

My invention relates to the manufacture of candy; and it consists in a new and improved article of trade, and in the method of and apparatus for producing the same, all as more fully hereinafter described and claimed.

The object of my invention is to produce an article which is not only attractive in shape and construction, but also one whose purity as to materials used in its manufacture can be determined by visual inspection; and to this end I take the candy in its plastic state and "spin" or form it into long, thin, narrow strips, and then bend or crimp these strips into a series of parallel folds. This bending or crimping may be effected in various ways—as, for example, the strips may be bent sidewise back and forth in alternate directions in planes at right angles to the length of the strip; or the strips may be bent around a series of pins, $v$, arranged in two rows on a board or table, E, the distance between the rows being equal to the desired depths of the crimps, and the distance between the pins in each row being equal to the desired distance between each crimp or fold.

In Fig. 4 is shown a board with pins arranged, as described, for effecting the above-described operation.

In practice, however, I have found that the above-described methods of shaping the candy are not only expensive, as requiring the work of an extra workman, but the completed product is imperfect in form or shape, it being almost impracticable by either of the above methods to produce an article in which the depth of and the distance between the several folds shall be uniform. I therefore prefer to form these crimps or bends by the mechanism constructed as hereinafter described.

A is a case or frame, of cast-iron or other suitable metal, in one side of which are formed two holes or openings, $a$, for the journals of the shafts $b\,b'$, which extend outside of the case A. On the inner ends of these shafts are secured the gear-wheels $c\,c'$, which intermesh with each other, and on one of the shafts, $b'$, is also secured the bevel-gear $d$, which meshes with the bevel-gear $e$ on the horizontal power-shaft $f$. One of the openings $a$ is increased in length longitudinally of the case, so as to allow of the adjustment of one of the shafts, $b$, to and from the other shaft, $b'$. To effect this adjustment of the shaft $b$, I form a lug on the case, and through this lug, which has a threaded opening, is screwed a bolt, $g$, whose inner end bears against the journal-box of the shaft $b$. To allow of this adjustment the teeth of the gear-wheels $c$ and $c'$ are made of a length sufficient to keep them constantly intermeshed.

On the outer ends of the shafts $b$ and $b'$ are secured the winged or toothed wheels B and B', which are somewhat similar in construction to the ordinary gear-wheels; but in place of having the notches $h$ between the wings or teeth $k$ equal in width to the teeth, they are made considerably wider, as shown in Fig. 1, so that as these winged wheels are rotated by the gears and shafts the wings or teeth on one wheel will project into the notches between the teeth on the other wheel; but there will always be a space between the teeth and the sides of the notches into which they project; and the wheels B and B' are always so adjusted in relation to each other that the wings or teeth on one wheel will not reach the bottom of the notch into which they project. The size of the space between the teeth and the sides and bottom of the notch is regulated by the adjusting-screws $g$ and $g'$, and the amount of adjustment depends upon the thickness of the strip to be crimped.

In order to protect the wheels B from dirt, and also to provide a bearing for the outer ends of the shafts $b\ b'$ and a guide for the strip of candy as it enters the machine, I secure on the case A a cover, A', which completely covers the wheels. In the top of this cover are formed two holes, $a^2$, similar to those in the top of the case A, which serve as top bearings for the shafts $b$ and $b'$. One of the holes $a^2$ is elongated, as in the case of the hole $a$, and within this hole is placed the journal-box of the shaft $b$. This journal-box is adjusted by a screw-bolt, $g'$, passing through a threaded lug, $l$, on top of the cover A'. In one side of the cover A', I form a narrow slit, $s$, which acts as a guide to the strip entering the machine, and prevents the workman from getting his fingers caught by the wheels B and B'. On the opposite side of the cover is formed a larger opening, $s'$, for the exit of the crimped candy. Under the meeting faces of the wheels B B', I insert a smooth plate, $o$, for the purpose of guiding and supporting the strip as it passes between the wheels. On the exit side of the machine are formed two perforated lugs, $t\ t$, into which are hooked the pins on the end of an inclined guide, $w$, which guides the crimped strip from the machine to the receiving-table.

I claim herein as my invention—

1. As a new article of manufacture, a strip of candy crimped or bent into a series of oppositely-disposed folds, substantially as set forth.

2. In the manufacture of candy, the method of preparing the same for exhibition and sale, which consists in "spinning" the candy into bands or strips, and then bending said bands or strips into a series of oppositely-disposed folds, substantially as set forth.

3. The combination of a frame or case, A, having two parallel shafts mounted therein, and the winged wheels, constructed as described, substantially as set forth.

4. The combination of a frame or case having two parallel shafts mounted therein, the winged wheels, constructed as described, and the cover A, provided with side slits or openings, which act as guides, substantially as set forth.

In testimony whereof I have hereunto set my hand.

LORENZO T. YODER.

Witnesses:
R. H. WHITTLESEY,
C. M. CLARKE.